J. S. BEHM.
Vehicle Spring Guard.
No. 102,209.  Patented April 26, 1870.
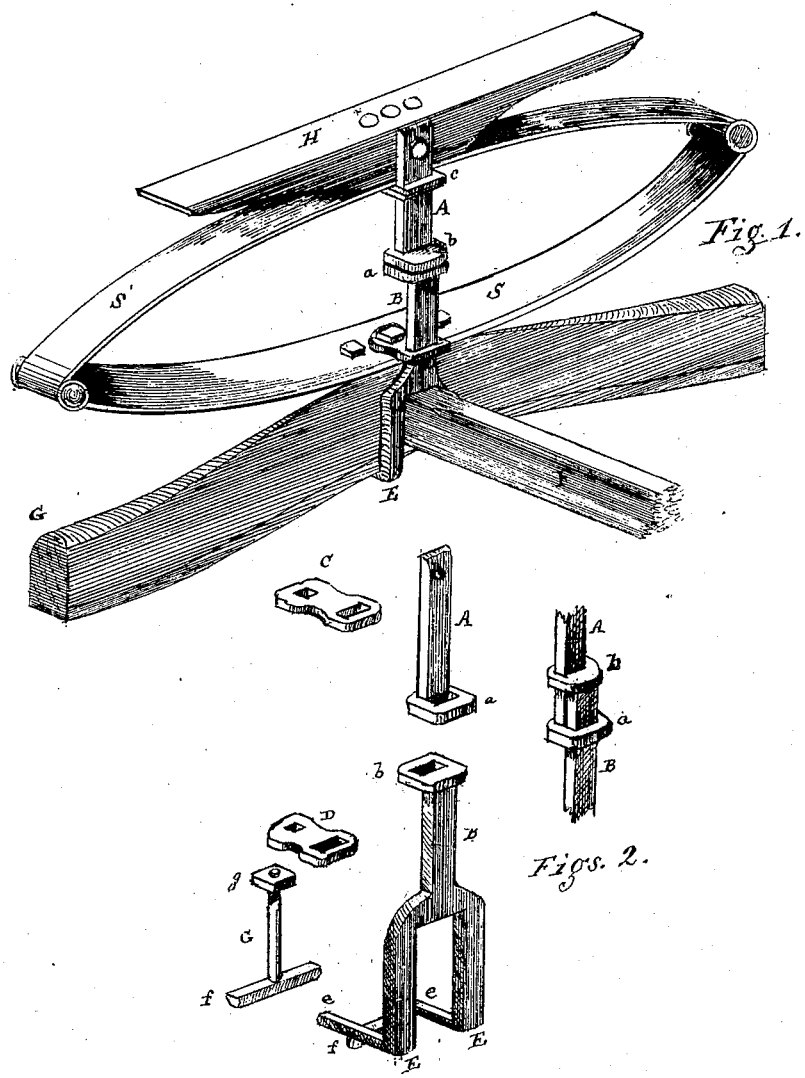

United States Patent Office.

JOHN S. BEHM, OF ELIZABETH TOWNSHIP, (PENN POSTOFFICE,) PENNSYLVANIA, AS-SIGNOR TO HIMSELF AND GEORGE KOEHLER, OF SAME PLACE.

Letters Patent No. 102,209, dated April 26, 1870.

IMPROVED SPRING-GUARD.

The Schedule referred to in these Letters Patent and making part of the same.

I, JOHN S. BEHM, of Elizabeth Township, (Penn Postoffice,) in the county of Lancaster, in the State of Pennsylvania, have invented certain Improvements in Guiding or Staying Elliptic Springs on Vehicles, of which the following is a specification.

The nature of my invention consists in providing two bars sliding vertically against each other through loops on each bar, reciprocally, one of said bars being connected by a loop-piece under the upper portion of the spring, as also to the head-block, and the other or lower bar, with a loop on the top of the lower portion of the spring divided and turned under, so as to embrace the coupling and axle of the vehicle.

The drawings clearly show the construction and application, in which—

Figure 1 is a perspective view of the spring and application and combination of the several parts.

Figure 2 shows the several parts detached, as also the ends of the yielding bars, with their loops, to show their action in one end of each bar sliding on the other, as the spring is depressed or brought together.

The upper bar A is bolted to the head-block or spring-bar H, passing through a slotted stay or loop-piece C, which is bolted to the under side of the spring and head-block H above, and stays the bar.

On the lower end of the bar A there is a slot or loop, $a$, through which the bar B passes, which is also provided with a similar loop, $b$, which embraces the bar A in like manner.

The bar B is stayed below by a loop-piece, D, which is secured by a bolt, G, having a cross-end, $f$, below and a screw end for a nut, $g$, above, below which loop the bar B is divided, so as to embrace the coupling-pole F on each side. The ends $e$ are bent around below the axle G, as shown. The lower cross-piece or long head $f$ of the bolt G draws these ends closely up, and keeps the bar firmly in place.

Thus constructed and united and affixed, the operation is readily understood, how the depression of the springs must act vertically and slide the looped bars on each other, by means of the loop and head attachment to each, one loop embracing the other bar.

I am aware that various devices are employed for guiding, staying, or guarding elliptical springs, so as to prevent lateral strain, and protect them from the liability of being broken by such twisting or jerking, frequently occurring in rough or stony roads. But I am not aware of the use of two bars sliding vertically upon each for such a purpose. Therefore,

What I claim as my invention is—

The bar A, with its looped end $a$, when combined with a bar, B, through a similar loop-head, $b$, together with its forked ends E E $e$ $e$, attached and secured to vehicles in the manner shown and for the purpose specified.

JOHN S. BEHM.

Witnesses:
CHARLES A. DUNLAP,
ABM. R. REIFF.